MULTIJUNCTION THERMOCOUPLES
Filed March 12, 1969
Fig. 1.
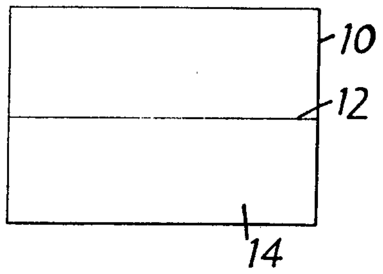
Fig. 2.
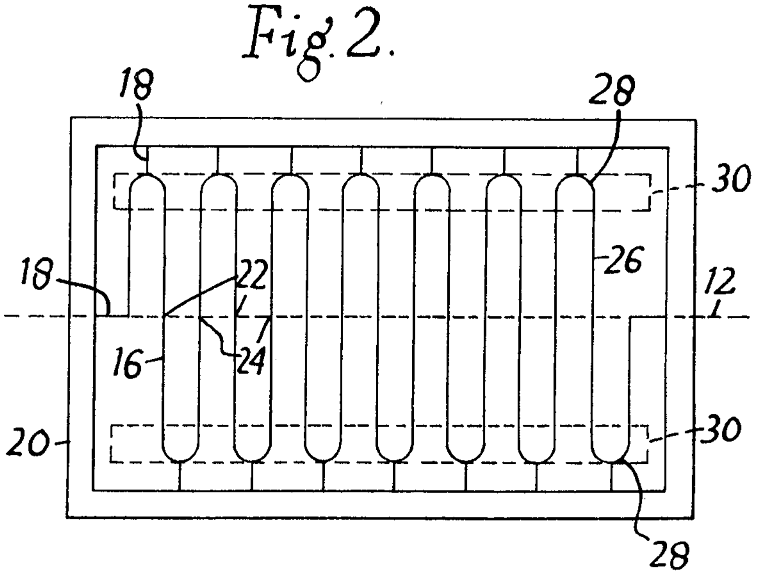
Fig. 3. Fig. 4.
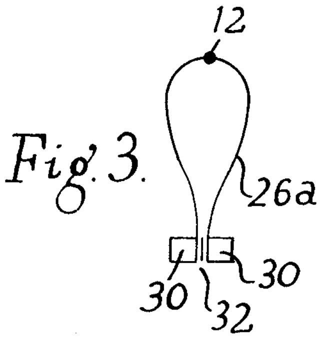
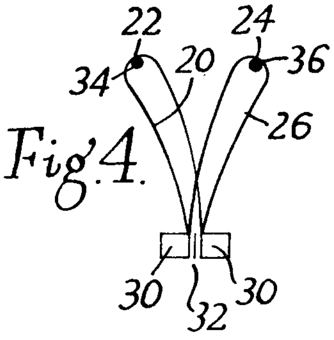

United States Patent Office 3,671,327

Patented June 20, 1972

3,671,327

MULTIJUNCTION THERMOCOUPLES

Frank Munro Gay, Felixstowe, Suffolk, England, assignor to A. C. Cossor Limited, Harlow, Essex, England Filed Mar. 12, 1969, Ser. No. 806,435
Claims priority, application Great Britain, Mar. 13, 1968, 12,260/68
Int. Cl. H01v *1/02*
U.S. Cl. 136—225 3 Claims

ABSTRACT OF THE DISCLOSURE

A multijunction thermocouple is made by etching a metal foil having differing metals to either side of a boundary line, so as to leave a pattern which zig-zags across the boundary line and forms a row of junctions along the boundary line.

Thermo-electric devices comprising a plurality of thermocouples, called in this specification multijunction thermocouples, are well known as sensitive detectors of small temperature differences, which may be used for a variety of purposes, including measuring the current in a heater wire adjacent the hot junctions. Several tens of junctions are frequently utilized and the overall structure is fine and intricate, involving substantial manufacturing difficulties and expense. The object of this invention is to provide an improved manufacturing method for a multijunction thermocouple, and also a thermocouple made by such a method.

The method according to the invention comprises the steps of forming a conductive foil having metals of differing conductivities to either side of a boundary line and removing the metal of the foil to leave a pattern which repeatedly crosses the boundary line, along which there is thus formed a row of junctions pertaining to two groups alternately.

For convenience the said two groups will be called the first junctions and the second junctions respectively. In a further step of manufacture the first junctions may be displaced as a body from the second junctions, each group of junctions being attached to a heater wire or other element which serves to determine in common the temperature of the junctions of that group. As is well known any such element must not electrically short together the junctions attached thereto.

A convenient way of displacing the two groups of junctions from each other is to bend the pattern back upon itself along the said boundary line to form the pattern into a series of loops. The loops can then be displaced alternately to one side and then the other.

The conductive foil having metals of differing conductivities to either side of a boundary line is best made by plating the metal with the higher conductivity over part only of a foil of the lower conductivity metal. As is well known, if the difference in conductivities is sufficient, the plated foil behaves thermoelectrically as if the plated part consists only of the plating metal.

The step of removing the metal to leave the said pattern can be effected by any suitable technique such as is employed in the manufacture of printed circuits, e.g. chemical etching through a photo-resist mask. Several patterns can of course be etched simultaneously from a large foil to speed and cheapen manufacture.

One embodiment of the invention will now be described in more detail, by way of example, with reference to the accompanying drawings, in which:

FIG. 1 shows a metal foil prior to etching,

FIG. 2 shows the etched foil,

FIG. 3 is an end view of the etched foil bent back upon itself, and

FIG. 4 is a similar view showing the two groups of junctions displaced from each other.

The drawings are not to scale.

In FIG. 1 a piece of constantan foil 10 which is 0.025 mm. thick is plated over half its area, i.e. to one side of a boundary line 12 running along the longitudinal centreline of the foil, with a relatively stress-free electrolytic copper layer 14. This layer may be 0.015 mm. thick. The foil may be perhaps 4 cm. by 2.5 cm. To facilitate handling the foil in subsequent operations the non-plated side is backed with a layer about 0.25 mm. thick of an epoxy resin or other support material (not shown). When the resin has cured the plated side of the foil is coated with a photo-resist, which is exposed through a negative and developed in conventional manner. The unwanted metal is then removed using a suitable etchant or by other means. This may also remove the backing, which may also be such as will remove the epoxy but if not the backing may be subsequently removed by another method.

The pattern to which the foil is etched is shown in FIG. 2 and consists of a sinuous pattern 16 joined by short bridges 18 to a frame 20, provided again to facilitate handling. There are therefore formed along the line 12 alternating first junctions 22 and second junctions 24.

The overall length of each sinuosity is 12 mm., made up of a straight middle portion 26 which is 8 mm. long with rounded end portions 28 which are 2 mm. in diameter. The pitch of the sinuous pattern is much exaggerated in FIG. 2 for clarity and is actually about 50 sinuosities per cm.

When the pattern has been etched, two copper bars 30 which act as heat sinks are bonded to, but electrically insulated from, the pattern at the positions indicated in broken lines in FIG. 2. The bonding can be effected by means of an insulating resin. The frame 20 and bridges 18 can then be cropped off. The bars are of square cross-section, 1.6 mm. on the side.

The etched foil is then bent back upon itself on the line 12 to bring the bars 30 together as shown in the end view of FIG. 3. The bars 30 are insulated from each other by a mica strip 32. The portions 26 of the sinuous pattern form into loops **26*a* with the line 12 on which the first and second junctions are disposed remote from the bars 30**.

The loops **26*a* are then bent alternately to one side and the other, as shown in FIG. 4 to separate the junctions 22 from the junctions 24. Heater wires 34 and 36 are then inserted through the loops and thermally attached to the junctions 22 and 24** respectively. The heater wires can be single or bifilar and suitable materials are 80/20 Nichrome and manganin. They can be insulated with a glass coating and be bonded to the junctions by means of a glass frit or other suitable agent.

The structure thus described can, if required, be assembled on a suitable mount and sealed in an evacuated envelope. Lead wires pass through the mount to the two ends of the sinuous pattern, and to the heaters.

The embodiment of the invention described and illustrated is a differential device with heater wires attached to both groups of junctions. Obviously one group of junctions could be treated as a cold group and effectively compensate the device against radiant energy from an outside source.

In the embodiment described above the boundary line 12 is straight. This is not necessarily the case. For example the starting material could take the form of a piece of constantan foil plated with a disc of copper. The sinuous pattern would then zig-zag back and forth across the periphery of the copper disc, the said boundary line being a circle. The boundary line can have any other desired shape depending upon the form which the thermocouple is to assume and the foil can be deformed as required before or after the pattern has been formed.

The embodiments of the invention in which an exclusive property or privilege is claimed are defined as follows:

1. A multijunction thermocouple comprising a sinuous strip of foil of a first metal formed of middle portions interconnected by end portions, each middle portion being of flat cross-section, a plated layer of a second metal having a higher conductivity than the first metal, said plated layer covering approximately half of one flat surface of each said middle portion and forming a thermoelectric junction approximately in the middle of the middle portion, first and second junctions alternating along the sinuous strip, the strip being of a distorted configuration which displaces the first junctions physically from the second junctions, a first thermally conductive element attached to and electrically insulated from said first junctions, and a second thermally conductive element attached to and electrically insulated from said second junctions.

2. A multijunction thermocouple according to claim 1, wherein said distorted configuration is such that the end portions at first ends of the middle portions are adjacent the end portions at the other ends of the middle portions, whereby each middle portion has the form of a loop, the loops containing the first junctions being deflected away from the loops containing the second junctions.

3. A multijunction thermocouple according to claim 1, wherein at least one of said thermally conductive elements is a heater wire.

References Cited

UNITED STATES PATENTS

| | | | |
|---|---|---|---|
| 404,861 | 6/1889 | Pfannkuche | 136—224 |
| 1,343,393 | 6/1920 | Hoffman | 136—201 |
| 2,741,127 | 4/1956 | Mason et al. | 136—225 |
| 3,018,311 | 1/1962 | Bagno et al. | 136—225 |
| 3,357,866 | 12/1967 | Belofsky | 136—226 |
| 3,381,368 | 5/1968 | Wilkins | 136—226 |
| 3,382,108 | 5/1968 | Wilkins | 136—226 |
| 2,381,819 | 8/1945 | Graves et al. | 136—225 |
| 2,022,515 | 11/1935 | Orchard | 136—225 |

FOREIGN PATENTS

| | | | |
|---|---|---|---|
| 751,758 | 7/1956 | Great Britain. | |

OTHER REFERENCES

Am. Inst. Physics, 1941, Gier et al., pp. 1284–1288.

BENJAMIN R. PADGETT, Primary Examiner

H. E. BEHREND, Assistant Examiner

U.S. Cl. X.R.

136—207